US006574947B2

(12) United States Patent
Landi et al.

(10) Patent No.: US 6,574,947 B2
(45) Date of Patent: Jun. 10, 2003

(54) METHOD OF MAKING A SADDLE PAD

(76) Inventors: Curtis L. Landi, 2050 Corporate Ct., San Jose, CA (US) 95131; Susan L. Wilson, 2050 Corporate Ct., San Jose, CA (US) 95131; Selver Kulovic, 2025 Lafayette St., Santa Clara, CA (US) 95050

( * ) Notice: Subject to any disclaimer, the term of this patent is extended or adjusted under 35 U.S.C. 154(b) by 0 days.

(21) Appl. No.: 10/165,695

(22) Filed: Jun. 7, 2002

(65) Prior Publication Data

US 2002/0152730 A1 Oct. 24, 2002

Related U.S. Application Data

(62) Division of application No. 09/513,492, filed on Feb. 25, 2000, now Pat. No. 6,415,583.
(60) Provisional application No. 60/121,809, filed on Feb. 25, 1999.

(51) Int. Cl.[7] .............................. B68C 1/08; B68C 5/00; B32B 3/00
(52) U.S. Cl. .............................. 54/65; 54/44.5; 54/44.7; 264/248; 428/71; 428/116
(58) Field of Search .......................... 54/65, 44.5, 44.7, 54/44.6; 264/239, 248, 241; 428/71, 73, 116, 117

(56) References Cited

U.S. PATENT DOCUMENTS

| | | | | | |
|---|---|---|---|---|---|
| 3,253,861 | A | | 5/1966 | Howard | |
| 3,258,894 | A | | 7/1966 | Hoaglin | |
| 3,879,245 | A | * | 4/1975 | Fetherston et al. | 156/245 |
| 4,013,810 | A | * | 3/1977 | Long | 428/313.9 |
| 4,241,465 | A | | 12/1980 | Yarimie et al. | |
| 4,422,183 | A | | 12/1983 | Landi et al. | |
| 4,457,032 | A | | 7/1984 | Clarke | |
| 5,039,567 | A | * | 8/1991 | Landi et al. | 428/116 |
| 5,067,189 | A | | 11/1991 | Weedling et al. | |
| 5,134,790 | A | | 8/1992 | Woitschaetzke et al. | |
| 5,139,845 | A | * | 8/1992 | Beckerman et al. | 428/117 |
| 5,180,619 | A | | 1/1993 | Landi et al. | |
| 5,203,607 | A | | 4/1993 | Landi | |
| 5,259,080 | A | | 11/1993 | Blaha | |
| 5,329,751 | A | | 7/1994 | Wadsworth | |
| 5,444,881 | A | | 8/1995 | Landi et al. | |
| 5,496,610 | A | | 3/1996 | Landi et al. | |
| 5,575,139 | A | | 11/1996 | Green | |
| 5,617,595 | A | | 4/1997 | Landi et al. | |
| 5,685,133 | A | | 11/1997 | Travis | |
| 5,749,111 | A | | 5/1998 | Pearce | |
| 5,804,030 | A | | 9/1998 | Jaegers et al. | |
| 5,840,397 | A | * | 11/1998 | Landi et al. | 428/73 |
| 6,050,067 | A | | 4/2000 | Knight et al. | |
| 6,447,627 | B1 | * | 9/2002 | Ickinger | 156/197 |
| 6,451,235 | B1 | * | 9/2002 | Owens | 264/86 |

* cited by examiner

*Primary Examiner*—Yvonne Abbott

(57) ABSTRACT

The inventive saddle pads are for placement between a saddle and a horse's back, or between a saddle and the rider, for therapeutic and cushioning protection for the horse and for the rider. The saddle pads incorporate a perforated honeycomb cellular structure which contours to the horse's back and/or the saddle to provide uniform load distribution. The honeycomb cells of the pad are aligned perpendicular to the horse's back and flex with movement to reduce shear forces against the horse's skin. The ability of the honeycomb to contour and flex with the movement helps keep the pad securely in place, eliminating rubbing and chafing.

1 Claim, 10 Drawing Sheets

METHOD OF MAKING A SADDLE PAD

This application is a divisional application of U.S. patent application Ser. No. 09/513,492, filed Feb. 25, 2000 now U.S. Pat. No. 6,415,583 and entitled "SADDLE PAD", which claims priority from the provisional application Serial No. 60/121,809, filed Feb. 25, 1999 and entitled "SADDLE PAD AND A METHOD OF MAKING SAME.

FIELD OF THE INVENTION

This invention relates to saddle pads for therapeutic and cushioning protection for the horse and for the rider.

The saddle pads of the present invention incorporate a perforated honeycomb cellular structure which contours to the horse's back and/or the saddle and provides uniform load distribution. The cellular structure relieves pressure by distributing it away from "hot spots." As a result, bony areas of the horse and/or the rider "feel" the same pressure as the surrounding anatomy.

When compressed when they are between the saddle and the horse, the honeycomb cells line themselves perpendicular to the horse's back and flex with movement to reduce sheer forces against the horse's skin. The ability of the honeycomb to contour and flex with movement helps keep the pad securely in place, eliminating rubbing and chaffing.

In accordance with one embodiment of the present invention, the honeycomb structures are incorporated within a surrounding fabric or leather pad portion.

In accordance with other embodiments of the present invention, the honeycomb pad is shaped and utilized to be placed independently between the saddle and the horse or between the saddle and the rider.

In accordance with another embodiment of the present invention, the portion of the pad that is positioned over the horse's shoulders at the withers is provided with honeycomb cells that are more rigid than the honeycomb cells in the remainder of the pad. This provides greater protection to the horse where greater pressure is normally applied to the horse in situations such as a working cowboy standing in the stirrups and securing his/her position on the horse by pressing with the inside of his/her legs against the horse's shoulders.

In accordance with still another embodiment of the present invention, the pad is formed with a self-supporting contour. Preferably, the contour placed in the region of the horses shoulders and withers is curved upwardly more than the contour at the rearward end of the pad. This pad is made by molding the pad as is conventional with other embodiments but then folding the pad over on itself and pressure sealing the folded pad in a substantially arcuate line of the pad and core adjacent the folded edge so the pad itself establishes a curved contour. With this embodiment, the pad can be switched back and forth so that either of the two broad surfaces can form the upper or outwardly exposed surface of the pad. With this construction in one embodiment of the present invention, the color of the different sides of the same pads can be selected to conform with the color traditionally used for different types of horse show riding such as white for dressage and black for hunter-jumper.

Since the pad in the present invention is made from a biomaterial which is not affected by moisture or sweat, it is anti-bacterial, anti-fungal and odor resistant. Both the honeycomb core and the covers are machine washable and dryer safe.

In accordance with still another embodiment of the present invention, the saddle pad is made of a honeycomb core that has a single perforated thermoplastic elastomeric facing and the opposite face of the pad is covered with a cloth material such as stretch nylon which provides even greater ventilation for the horse.

DESCRIPTION OF THE PREFERRED EMBODIMENT

Figure 1:
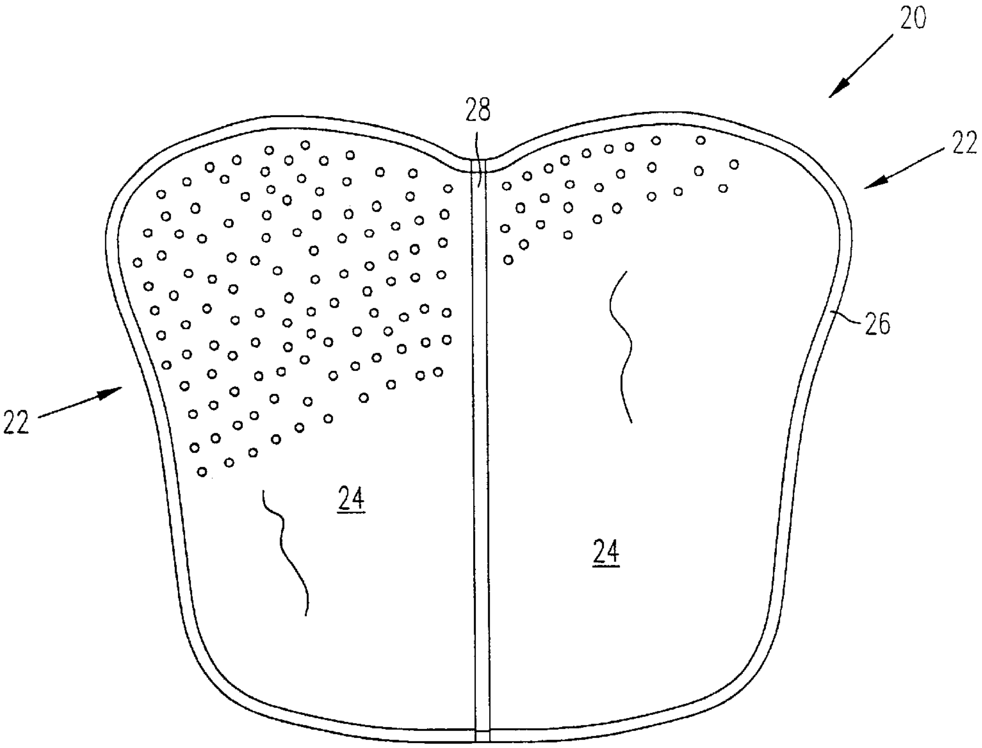
FIG. 1 is a plane view of a saddle bag in accordance with one embodiment of the present invention.

Referring now to FIG. 1, there is shown a plane elevational view of a saddle pad 20 made in accordance with the present invention having two side panel portions 22, each containing a perforated honeycomb structure consisting of a perforated cellular core and perforated cover panels wherein the cover panels are thermal compression bonded around the periphery 26 of the pad and along a separation portion 28 centrally and longitudinally of the pad where the pad will fold over the top of the horse's back.

Figure 2:
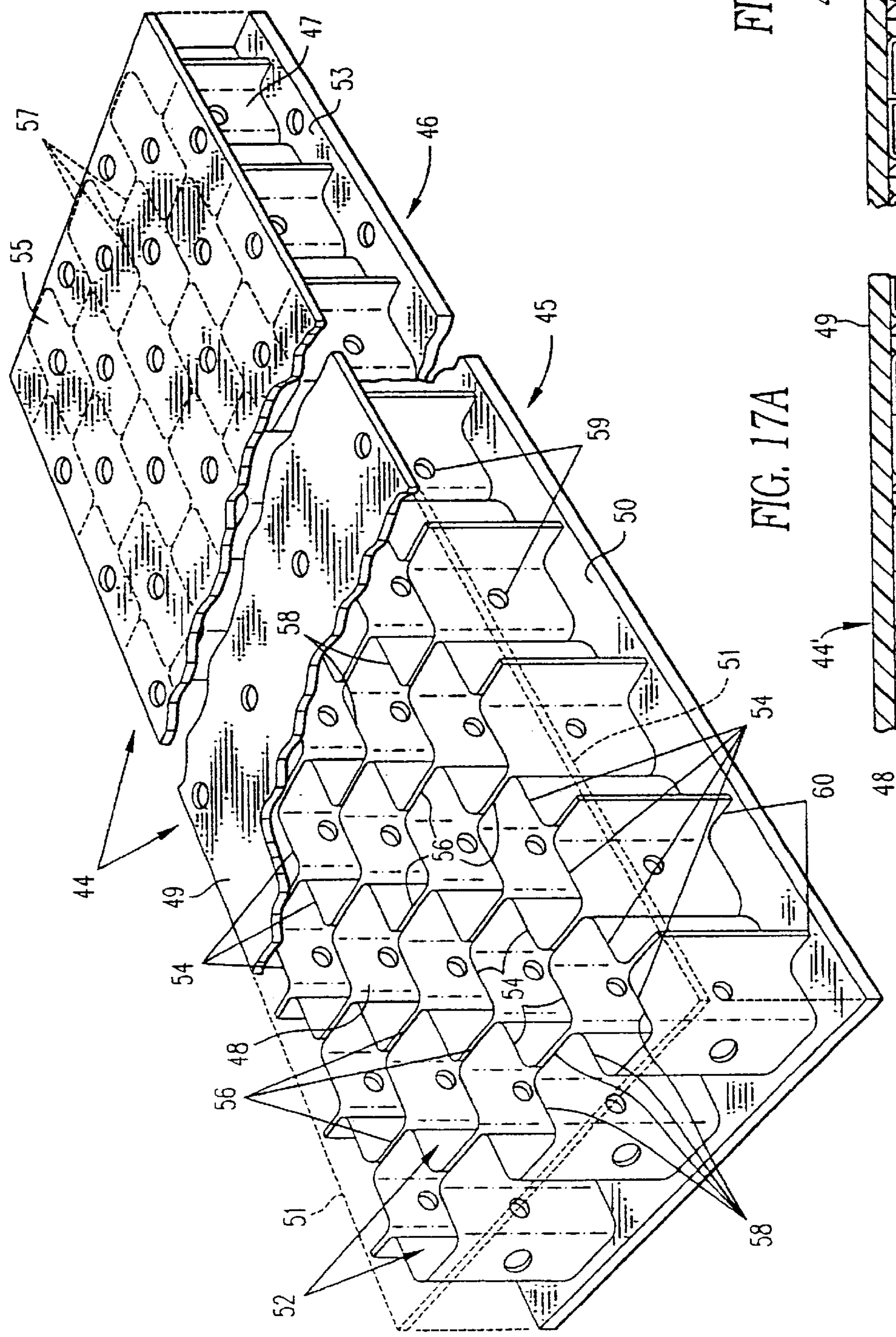
FIG. 2 is a perspective view with the top cover sheet partially broken away in the foreground and with the position of the walls of the honeycomb core illustrated in phantom in the far rear background.

FIG. 2 illustrates a section 44 of the honeycomb material that makes up each of the panels 22 of the pad 20. The honeycomb section 44 is formed with a perforated honeycomb core 48 and perforated facing sheets 49 and 50. The dashed lines 51 illustrate the normal full coverage of the top facing sheet 49. At the periphery of each panel portion 22 and at the separation portion 28 the edges of the sheets 49 and 50 are pressed down and thermal bonded together around the periphery 26 of the pad.

The honeycomb core 48 is made from sheets of a selected grade thermoplastic elastomeric material that has been preformed such that a matrix of small holes exists throughout. The sheets are compression bonded together in spaced intervals staggered between alternating sheets as described in U.S. Pat. Nos. 5,039,567, 5,180,619, and 5,617,595 and incorporated herein by reference. The resulting stack is then cut into strips which when expanded create a honeycomb network of elongated generally hexagonal-shaped cells 52.

Each cell 52 of the honeycomb core 48 is defined by four generally S-shaped wall segments, each interior wall of which is shared by an adjacent cell. The wall segments of each cell 52 include a single thickness wall portion 54 and a double thickness wall portion 56.

The upper and lower faces 58 and 60 of the walls forming several cells are deformed during a planerization operation as disclosed in the referenced patents to stabilize the honeycomb core and prevent the expanded strip stock from collapsing. The facing sheets 49 and 50, cut from sheets of resilient thermoplastic material, are then compression bonded to the upper and lower faces 58 and 60. The addition of the facing sheets 49 and 50 strengthens the core.

By perforating both the honeycomb core and the facings, the weight of the material is reduced while the resiliency and flexibility is increased. The weight is reduced because perforations reduce the overall quantity of the material comprising the honeycomb and facing. Similarly, the flexibility is increased because there is less material to constrain each segment of the material from bending. The resiliency, or ability of the structure to spring back to its original form from being compressed, is also enhanced by virtue of the additional passages through which air can return to fill the cells. It will be appreciated that the resilient but damped restorative characteristics of the structure make it an excellent absorber of shock waves.

Figure 3:
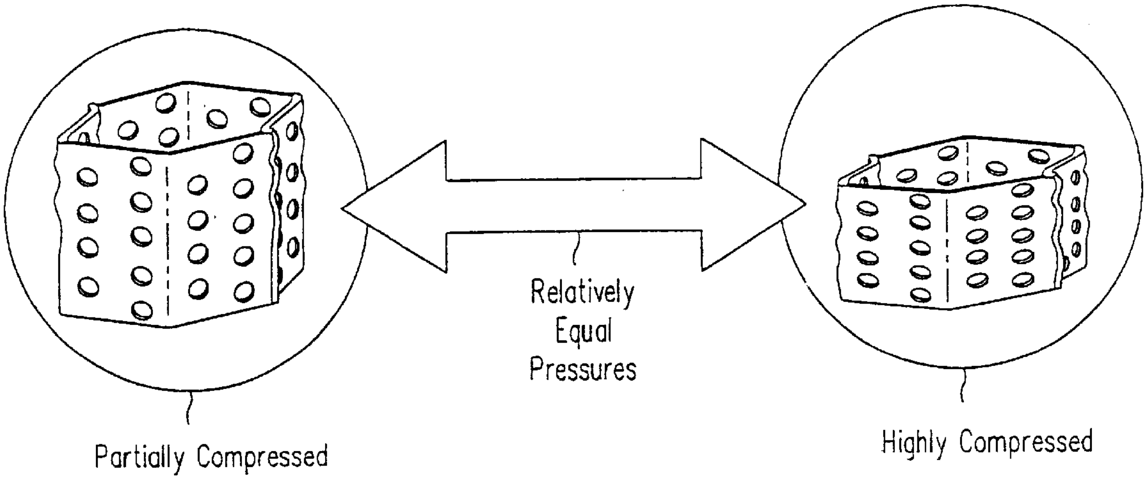
FIG. 3 is a schematic view illustrating the equal pressure characteristics of the saddle pad of the present invention when partially or highly compressed.
Figure 4:
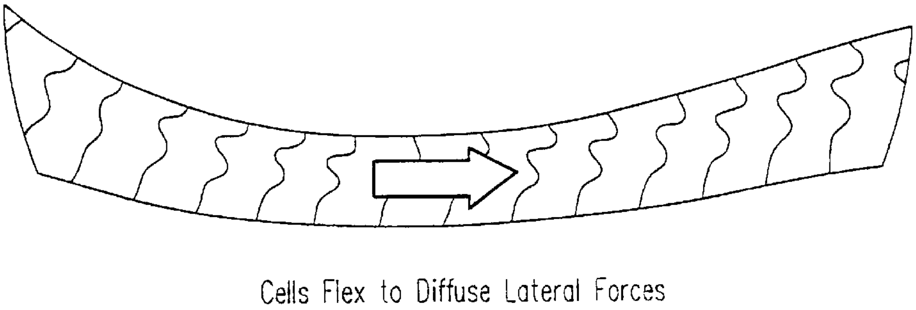
FIG. 4 is a schematic elevational view illustrating how the cells of the saddle pad flex to diffuse lateral forces.

FIG. 3 illustrates how the honeycomb cellular structure contours to the horse's back and provides uniform load distribution, and FIG. 4 illustrates how the honeycomb cells align themselves perpendicular to the horse's back and flex with movement to reduce sheer forces against the horse's skin.

Figure 5:
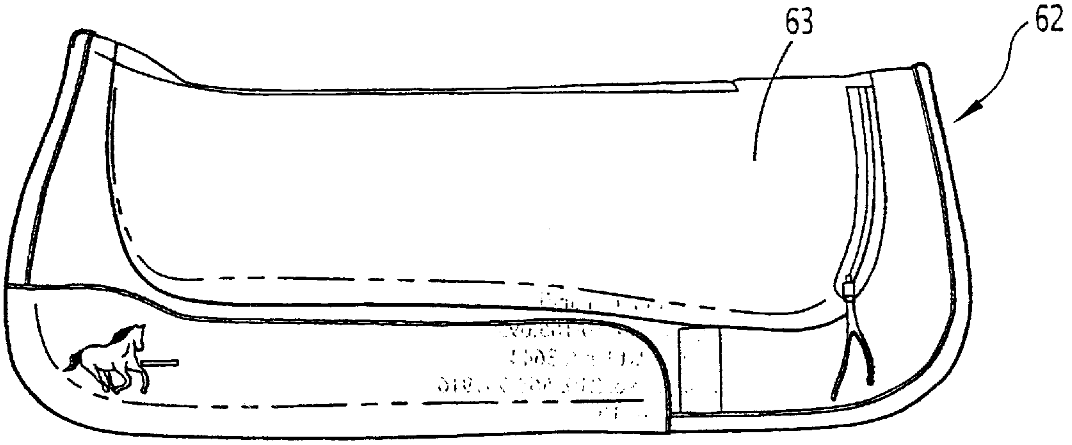
FIG. 5 is a side elevational view of a western saddle pad incorporating aspects of the present invention.

FIG. 5 illustrates a western saddle pad 62 provided on each side with a zippered panel 63 which contains a removable honeycomb insert. The underside is lined with breathable wool that works with the ventilated honeycomb to keep the horse's back cool. The top line of the pad is split and connected with breathable wool to further promote ventilation. Ample honeycomb in the rear of the pad easily accommodates the extra weight of saddle bags. In accordance with one embodiment of the present invention, in a western saddle pad as shown in FIG. 5, each of two separate panels of honeycomb are sealed on their perimeters on three sides and then the two unsealed perimeter portions of the two panels are heat sealed together to provide a single panel with a middle center seal.

Figure 6:
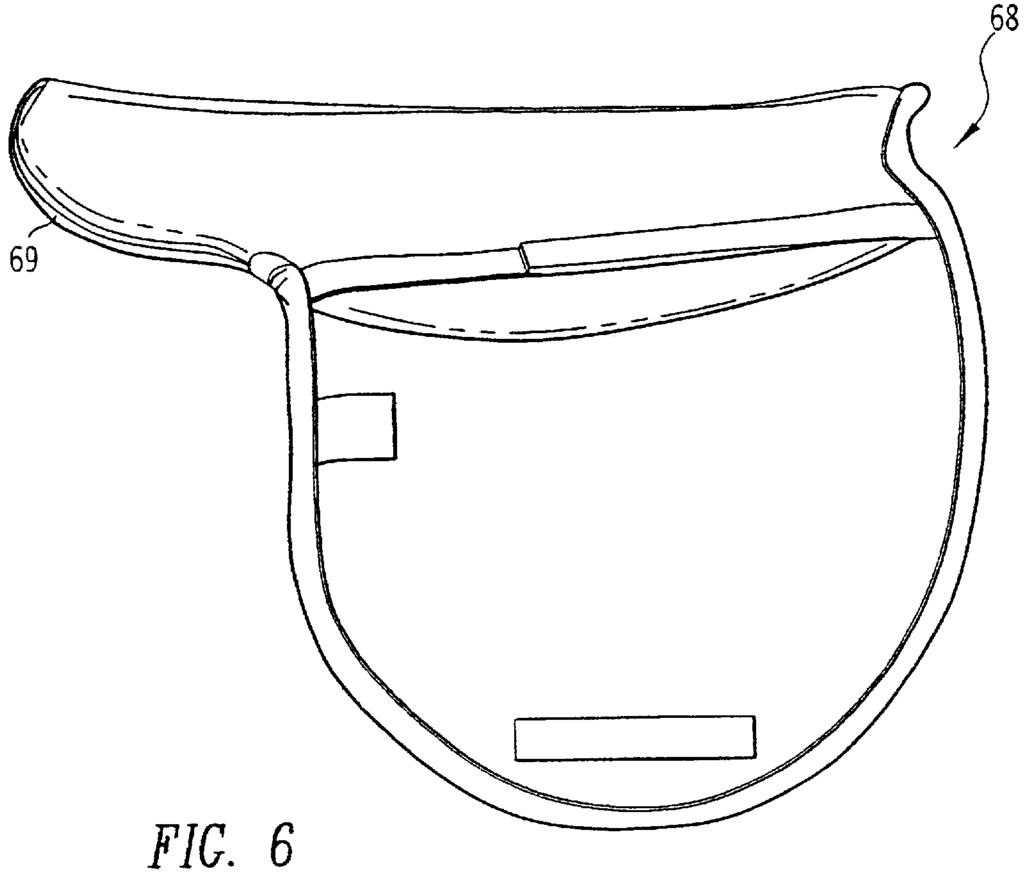
FIG. 6 is a side elevational view of an English saddle pad incorporating aspects of the present invention.

FIG. 6 discloses an English saddle pad embodiment 68 of the invention preferably made from plush, ultrasuede that is both durable and machine washable. The zippered cover 69 contains two removable honeycomb panel inserts that are anatomically-shaped to insure maximum protection for the horse. Breathable wool on the underside of the pad works with the ventilated honeycomb to wick away moisture and minimize sweat. In accordance with an embodiment of the present invention, in an English saddle pad a single honeycomb panel is sealed around its perimeter and one of the facing sheets of the honeycomb panel is cut along the middle of the panel. The panel is then folded along the facing sheet cut, and the folded panel is thermally sealed along the center cut.

Figure 7:
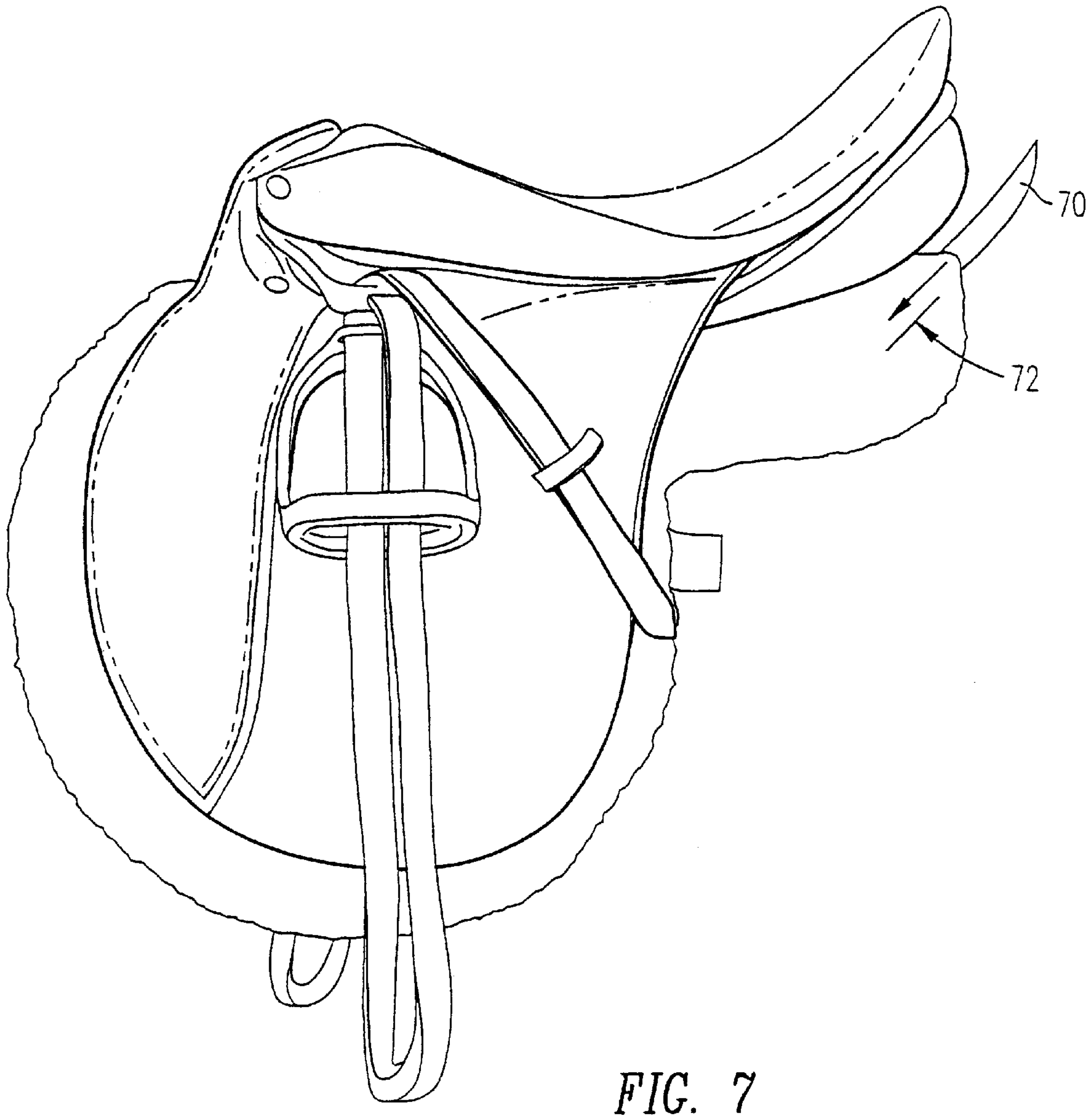
FIG. 7 is a side perspective view illustrating a close contact show pad incorporating aspects of the present invention.

In the embodiment of FIG. 7, a close contact show pad 70 has a concealed zipper 72 in the rear of the pad which contains a removable honeycomb panel. The cover is made of high-quality wool fleece with the underside being a breathable cotton quilt. Both the honeycomb and the cover are machine washable and dryer safe. In accordance with another embodiment of this invention, the honeycomb panel of the show pad is provided on one side with a fabric that is heat sealed around the periphery of the pad.

Figure 8:
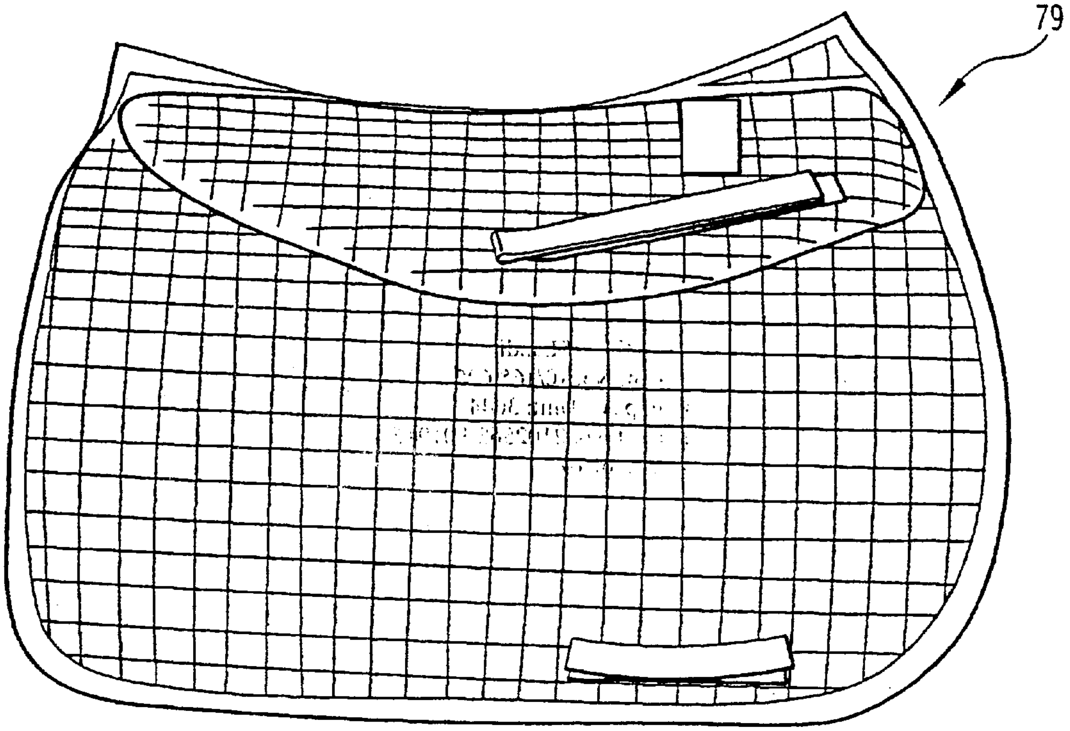
FIG. 8 is a side elevational view of a dressage pad incorporating aspects of the present invention.
Figure 8A:
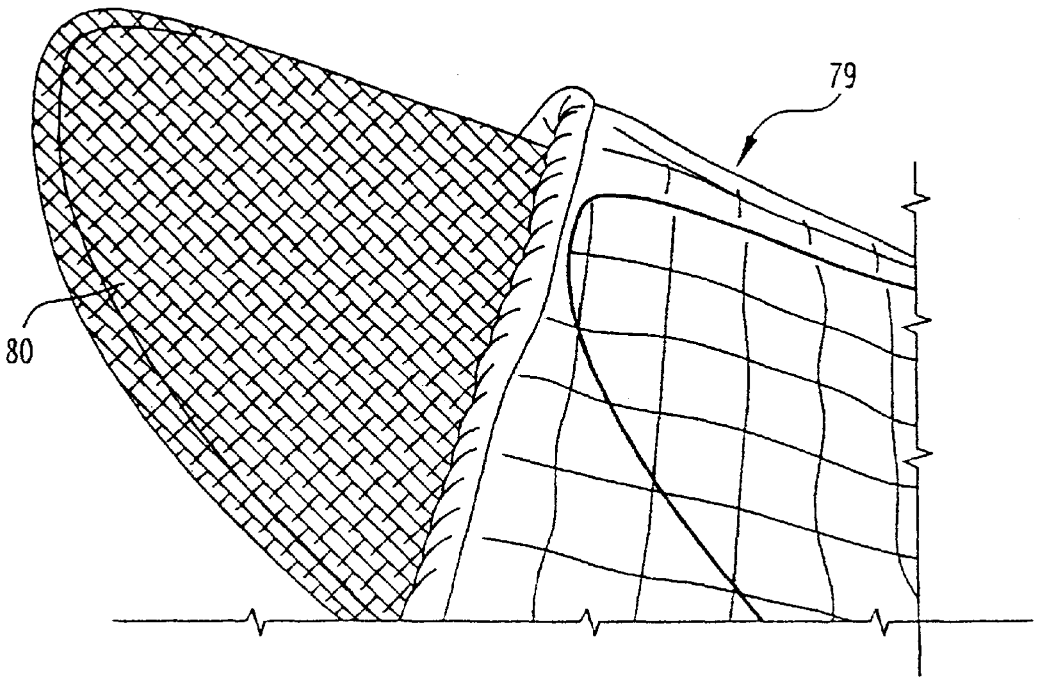
FIG. 8A is an enlarged perspective view of the end of the structure shown in FIG. 8, with the saddle pad with a perforated honeycomb insert portion partially withdrawn from its normal position.

FIG. 8 illustrates a dressage pad 79 which contains two removable honeycomb inserts in a cover made of natural, cotton quilt. Both the honeycomb and the cover are machine washable and dryer safe. FIG. 8A illustrates the honeycomb insert 80 partially removed from its normal position.

Figure 9:
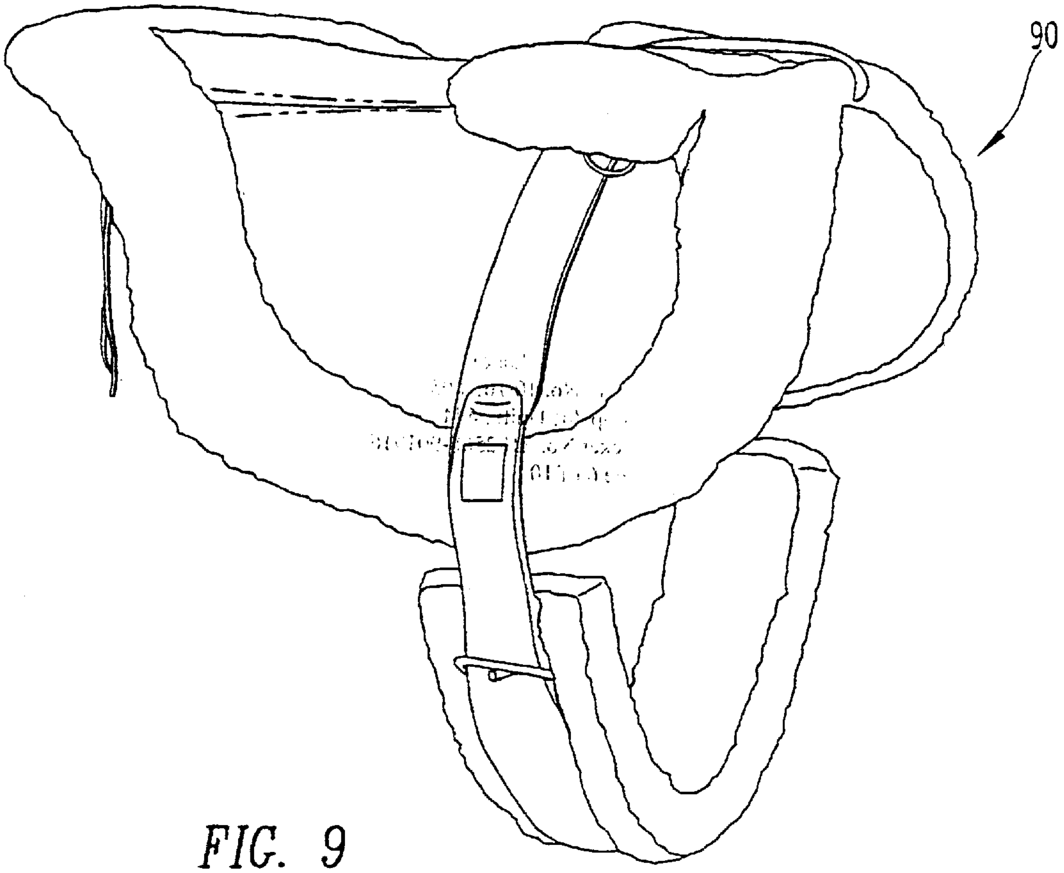
FIG. 9 is a side elevational view of a bare-back and training pad incorporating features of the present invention.
Figure 9A:
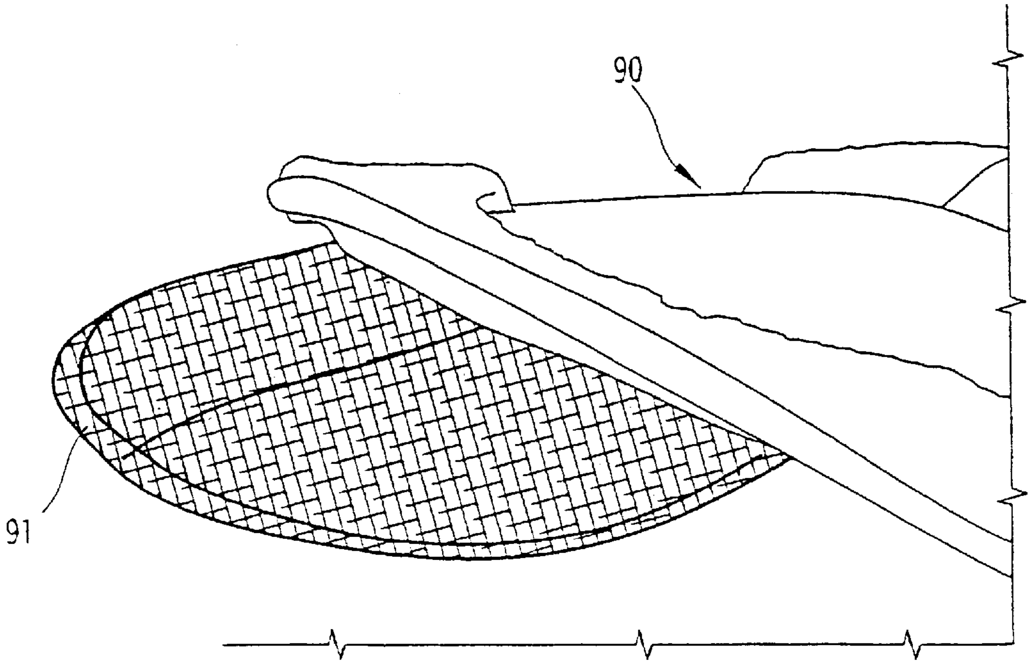
FIG. 9A is an enlarged perspective view of a portion of the structure shown in FIG. 9, with the honeycomb insert partially removed from its storage position.
Figure 11:
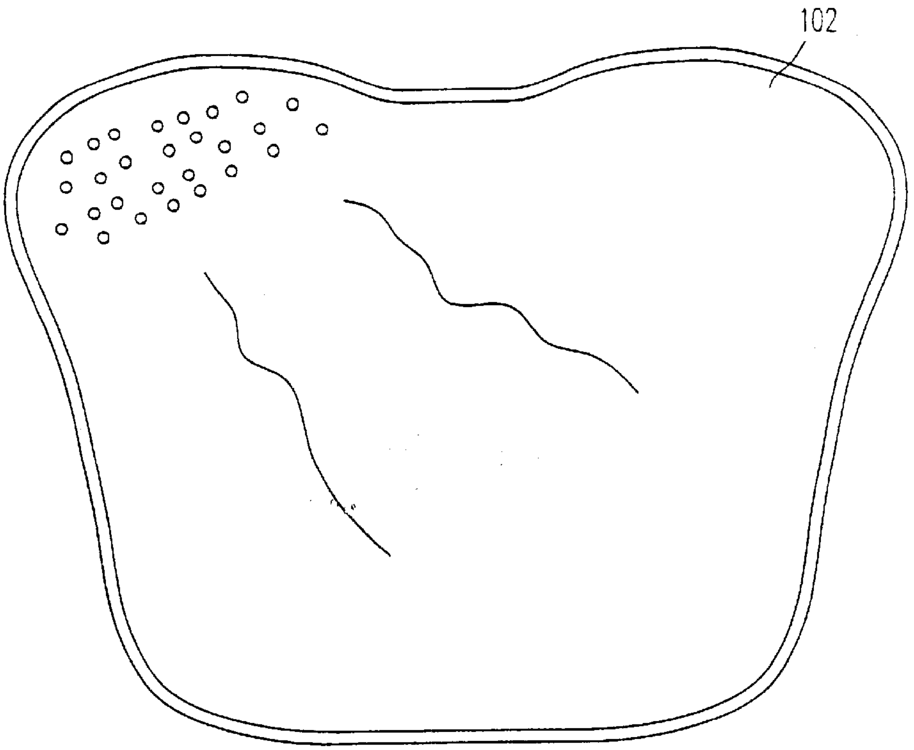
FIG. 11 is a plane view of the initial formation of a saddle pad for producing a contoured pad.

FIG. 9 illustrates a bare-back and training pad 90, and FIG. 9A illustrates the honeycomb panel 91 partially removed.

Figure 10:
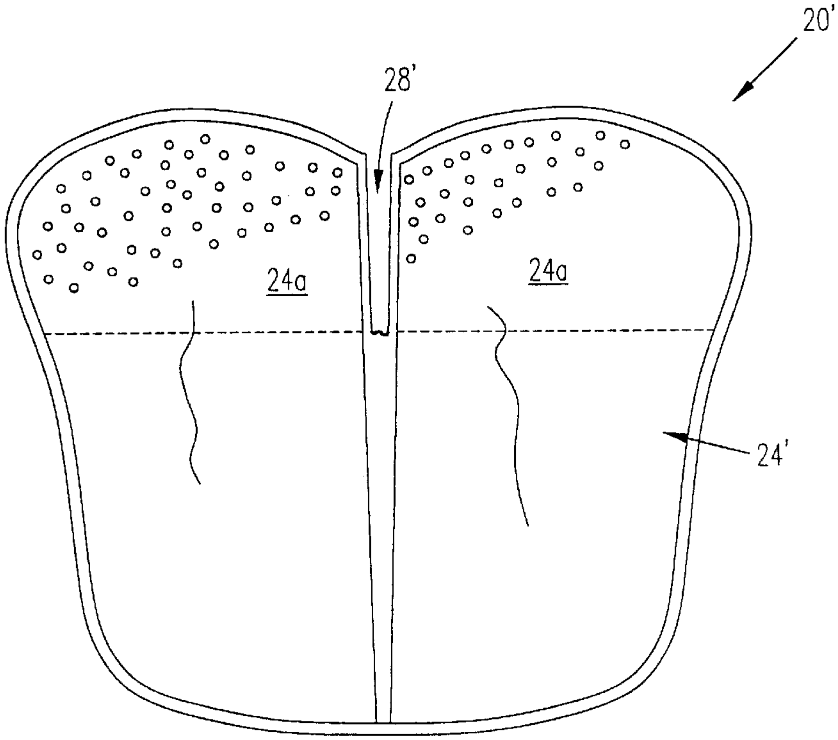
FIG. 10 is an alternative embodiment of the present invention incorporating cellular honeycomb of different flexibilities.

Referring now to FIG. 10, there is an alternative embodiment of the present invention wherein the separation portion 28' of the saddle pad 20' is open near the front of the pad where the withers of the horse would be located. The front portion 24A of the pad 20' adjacent the open separation 28' is formed of honeycomb cells that are more rigid than the honeycomb cells in the remainder of the pad. This construction provides greater protection to the shoulder area of the horse when a rider is in working position clamping the rider's legs to the horse for stability. In an alternative embodiment of saddle pad shown in FIG. 10, the front portions 24A of the panel or other portions and/or the entire panel are made stiffer by applying a thin denser and/or stiffer perforated honeycomb layer having an outer perforated facing sheet is applied on top of the facing sheet of the honeycomb panel.

Figure 12:
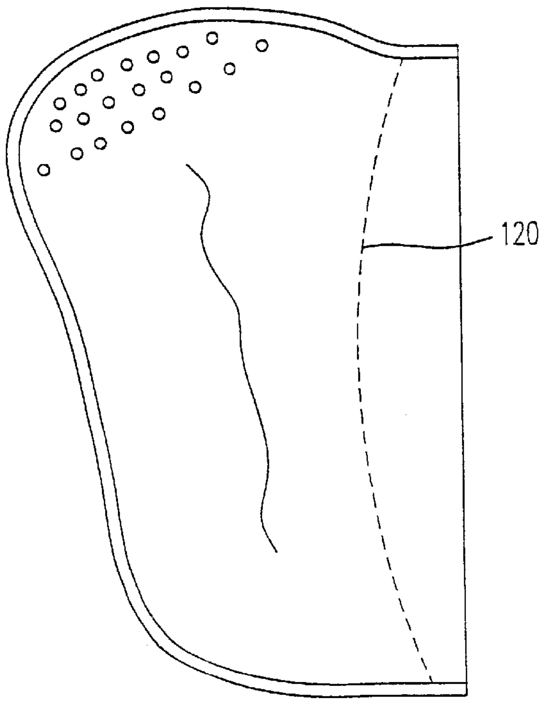
FIG. 12 is a view showing the structure of FIG. 11 folded in position for molding to establish a contour.
Figure 13:
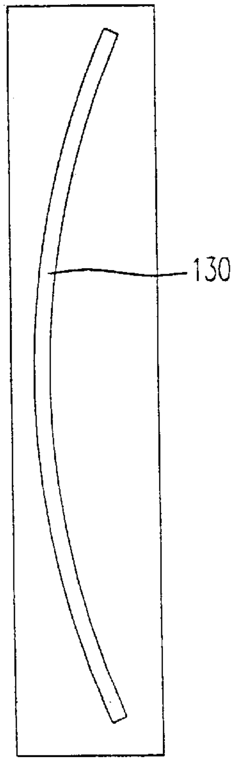
FIG. 13 is a plane view of the rib in a mold to establish a curved edge to the folded pad shown in FIG. 12, which produces a contoured pad.
Figure 14:
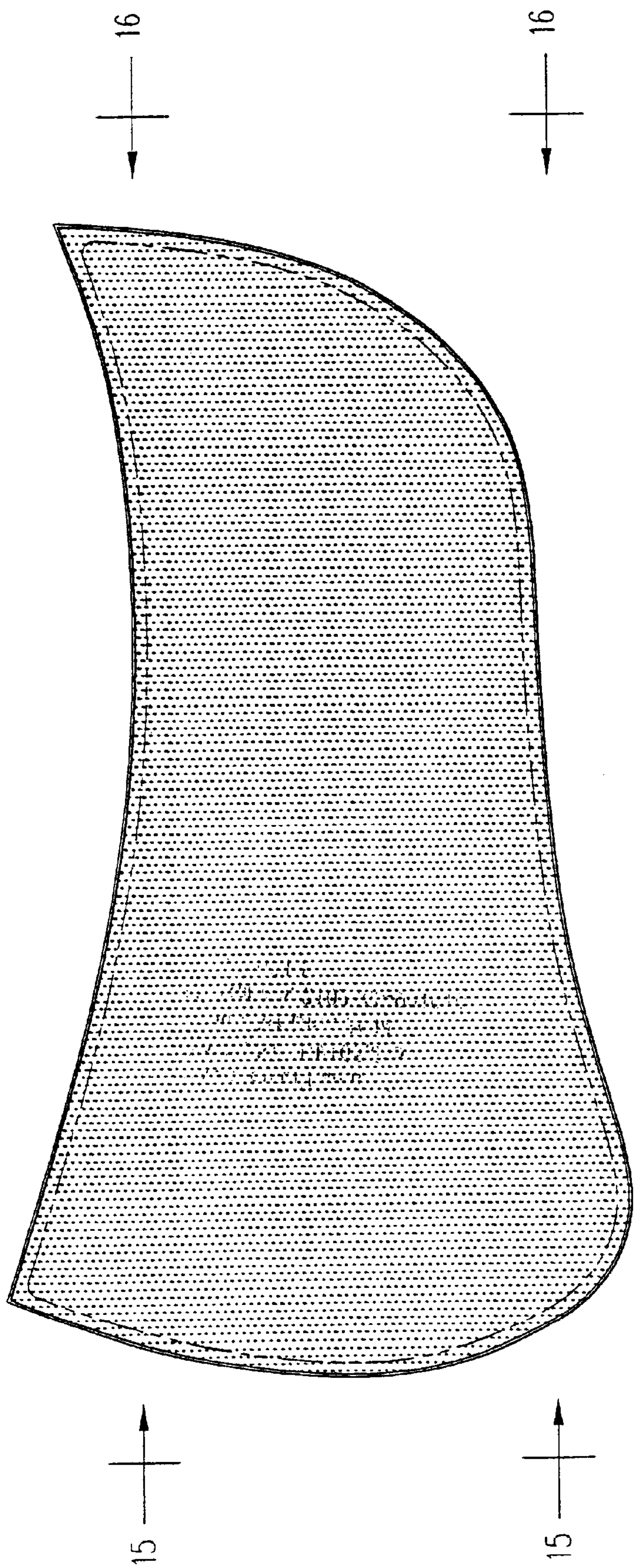
FIG. 14 is a side elevational view of the pad formed from the sequence of use of FIGS. 11–13.
Figure 15:
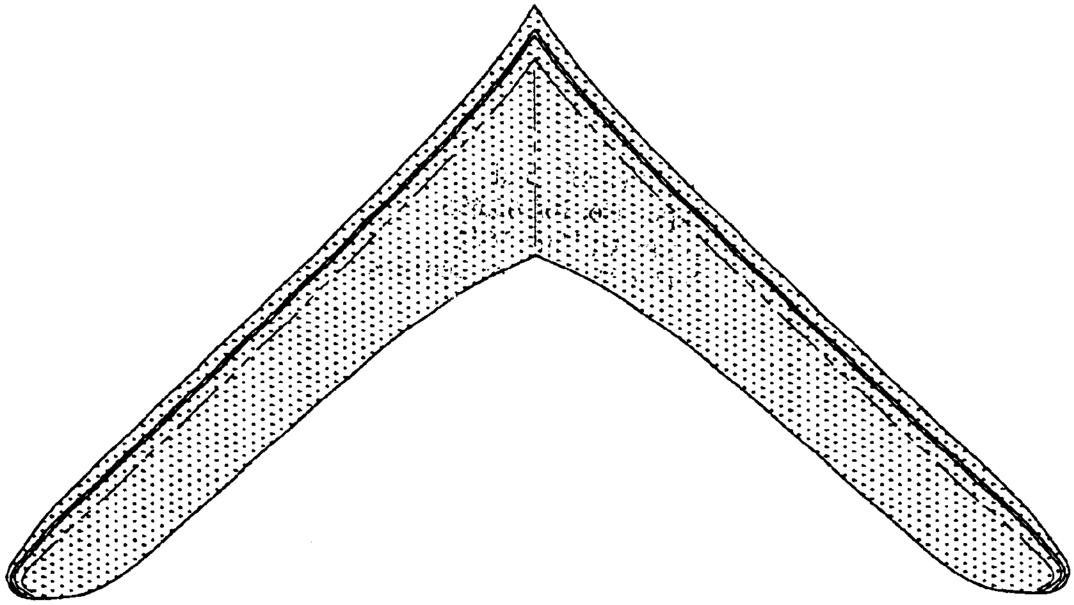
FIG. 15 is a front view taken along line 15—15 of the structure shown in FIG. 14.
Figure 16:
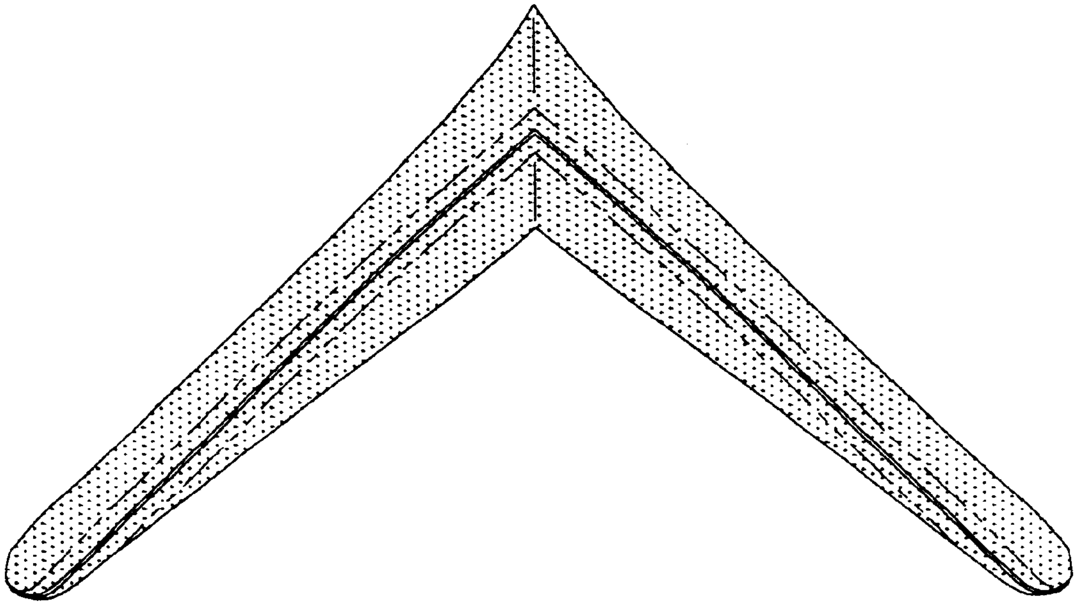
FIG. 16 is a rear elevational view taken along line 16—16 of the structure shown in FIG. 14.

FIGS. 11–16 illustrate the manufacture of a self-supporting contoured pad 100 resulting therefrom. This pad is made by molding a pad 102 shown in FIG. 11 as is conventional with other embodiments but with a wider section in the middle of the pad toward the front end of the pad. This pad 102 is then folded along a center line as shown in FIG. 12 and then placed in a sealing mold as shown in FIG. 13 with an arcuate thermal sealing ridge 130 to form an arcuate seal at the position designated 120 in FIG. 12, and wherein the excess portion of the foam pad to the right of the line 120 in FIG. 12 is trimmed to leave the contoured pad as shown in FIGS. 14–16. Because this self-supporting contoured pad 100 is reversible with the identical contour, one face sheet can be made of white material for use in dressage and the other face sheet can be made of black material for hunter-jumper shows. A single pad can then be used for different shows.

Figure 17B:
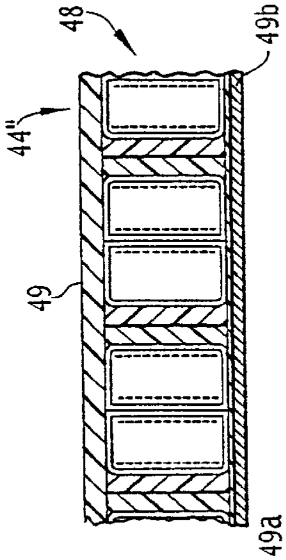
FIGS. 17*a* and 17*b* are elevational sectional views of a portion of a saddle pad in accordance with other embodiments of the present invention.
Figure 17A:
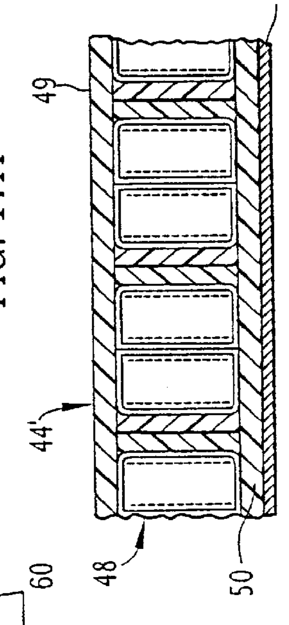

A cross-sectional view of two final embodiments of the present invention are shown in FIGS. 17A and 17B. In FIG.

17A the honeycomb core 48 of panel 44' includes perforated facing sheets 49 and 50 of resilient thermoplastic material with a fabric material 49*a* fused on at least facing sheet 50. In FIG. 17B the honeycomb panel 44" contains only one face panel 49 thermal compression bonded to the core 48. The cells are open at the other face which is then covered a breathable, stretch nylon fabric 49*b*. This pad with the nylon fabric 49*b* placed against the skin of a horse provides a higher degree of ventilation to the horse's skin. The honeycomb panel of this embodiment without the second facing sheet is more flexible and drapes easier than the honeycomb panel with two facing sheets.

As will be appreciated from the foregoing description, many of the embodiments include the saddle pad contained in a pocket in another pad or saddle. Other embodiments include the pad as a separate element that can be positioned between the saddle and the back of the horse. Additionally, the same or a similar pad can be placed on top of the saddle underneath the rider to provide cushioning and therapeutic features for the rider.

We claim:

1. The method of manufacturing a saddle pad cushion comprising the steps of:

thermal compression bonding plastic core strips together and expanding said strips into a honeycomb shaped core, thermal compression bonding resilient facing sheets to faces of the honeycomb shaped core thereby forming a panel with a honeycomb core, folding said panel over on itself, and pressure sealing the folded panel in an arcuate line across the folded panel so that said panel itself establishes a two sided curved contour.

* * * * *